United States Patent
Chang et al.

(10) Patent No.: US 10,281,638 B2
(45) Date of Patent: May 7, 2019

(54) WAVELENGTH CONVERTING MODULE AND LIGHT-SOURCE MODULE APPLYING THE SAME

(71) Applicant: DELTA ELECTRONICS, INC., Taoyuan (TW)

(72) Inventors: Keh-Su Chang, Taoyuan (TW); Yen-I Chou, Taoyuan (TW); Chi Chen, Taoyuan (TW); Chun-Hsien Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 154 days.

(21) Appl. No.: 15/007,226

(22) Filed: Jan. 27, 2016

(65) Prior Publication Data

US 2017/0068034 A1   Mar. 9, 2017

(30) Foreign Application Priority Data

Sep. 7, 2015 (TW) .............................. 104129456 A (51) Int. Cl.
| | |
|---|---|
| F21V 8/00 | (2006.01) |
| G02B 1/11 | (2015.01) |
| G02B 5/02 | (2006.01) |
| G02B 7/00 | (2006.01) |
| G02B 26/00 | (2006.01) |
| G02B 27/14 | (2006.01) |
| G03B 21/20 | (2006.01) |

(52) U.S. Cl.
CPC .......... *G02B 6/003* (2013.01); *G02B 6/0015* (2013.01); *G02B 6/0028* (2013.01); *G02B 6/0036* (2013.01); *G02B 6/0055* (2013.01); *G02B 6/0085* (2013.01); *G03B 21/204* (2013.01); *G02B 1/11* (2013.01); *G02B 5/0294* (2013.01); *G02B 7/008* (2013.01); *G02B 26/008* (2013.01); *G02B 27/141* (2013.01)

(58) Field of Classification Search
CPC .. G02B 6/0003; G02B 6/0008; G02B 6/0015; G02B 6/0028; G02B 6/0026; G02B 6/0036; F21V 9/16; F21K 9/64
See application file for complete search history.

(56) References Cited

U.S. PATENT DOCUMENTS

| | | | | |
|---|---|---|---|---|
| 6,962,426 B2 * | 11/2005 | Slobodin | .............. | G02B 26/008 362/293 |
| 7,020,378 B2 * | 3/2006 | Poisel | .................. | G02B 6/0003 385/141 |
| 8,369,005 B2 * | 2/2013 | Yamamoto | ......... | A61B 1/00165 359/341.1 |

(Continued)

FOREIGN PATENT DOCUMENTS

| CN | 2593227 Y | 12/2003 |
|---|---|---|
| CN | 201093348 Y | 7/2008 |

(Continued)

*Primary Examiner* — Peggy A Neils
(74) *Attorney, Agent, or Firm* — CKC & Partners Co., LLC (57) ABSTRACT

A wavelength converting module includes a wavelength converting unit. The wavelength converting unit is at least made of a phosphor material. The wavelength converting unit is a solid rod-shaped structure, in which two opposite end surfaces of the rod-shaped wavelength converting unit are a light-entrance surface and a light-exit surface respectively.

7 Claims, 6 Drawing Sheets

(56) References Cited

U.S. PATENT DOCUMENTS

| | | | | |
|---|---|---|---|---|
| 8,851,694 B2* | 10/2014 | Harada | .................... | F21V 9/16 |
| | | | | 362/259 |
| 8,858,429 B2* | 10/2014 | Mizuyoshi | ........... | A61B 1/0653 |
| | | | | 600/118 |
| 9,346,395 B2* | 5/2016 | Sato | .......................... | F21V 9/16 |
| 9,631,794 B2* | 4/2017 | Kamee | ................... | F21V 13/08 |
| 2008/0081011 A1* | 4/2008 | Oshio | ................... | C04B 35/597 |
| | | | | 423/263 |
| 2008/0232084 A1 | 9/2008 | Kon | | |
| 2012/0242912 A1* | 9/2012 | Kitano | ................ | H04N 9/3111 |
| | | | | 348/759 |
| 2013/0083296 A1* | 4/2013 | Ogura | ................ | G03B 21/204 |
| | | | | 353/31 |
| 2015/0109602 A1* | 4/2015 | Martin | ................... | F41G 1/345 |
| | | | | 356/3 |
| 2016/0291232 A1* | 10/2016 | Hikmet | ..................... | F21K 9/61 |
| 2017/0241619 A1* | 8/2017 | Fidler | ................ | C09K 11/7706 |
| 2018/0024425 A1* | 1/2018 | Fujita | ................... | G03B 21/204 |

FOREIGN PATENT DOCUMENTS

| | | | |
|---|---|---|---|
| CN | 202109406 U | 1/2012 | |
| CN | 102937773 A | 2/2013 | |
| TW | 457469 B | 10/2001 | |
| TW | 201011442 A1 | 3/2010 | |
| TW | I412803 B | 10/2013 | |
| TW | 201527487 A | 7/2015 | |

* cited by examiner

WAVELENGTH CONVERTING MODULE AND LIGHT-SOURCE MODULE APPLYING THE SAME

RELATED APPLICATIONS

This application claims priority to Taiwan Application Serial Number 104129456, filed Sep. 7, 2015, which is herein incorporated by reference.

BACKGROUND

Technical Field

The present disclosure relates to a wavelength converting module and a light-source module applying the wavelength converting module.

Description of Related Art

In recent years, optical projectors have been applied in various fields. The optical projectors have served on an expanded range of purposes, for example, from consumer products to high-tech devices. Some kinds of optical projectors are widely used in schools, household and commerce in order to amplify image signals provided by an image signal source and then display on a projection screen. Nowadays, light sources of the optical projectors, such as high-pressure mercury-vapor lamps, tungsten-halogen lamps, and metal-halogen lamps, are known to have high power consumption, with a short lifetime, as well as they are bulky, and generate high heat.

With the development of the optical projectors, for the purpose of reducing the power consumption and the device size, a solid-state light-emitting element is employed in a light source module of the optical projector to replace the high power lamp described above.

SUMMARY

An aspect of the present disclosure is to provide a wavelength converting module including a wavelength converting unit, in which the wavelength converting unit is at least made of a phosphor material and is a solid rod-shaped structure. With the solid rod-shaped structure of the wavelength converting unit, an optical coupling efficiency and a heat dissipation efficiency of the wavelength converting unit can be improved. Moreover, since shapes or sizes of a light-entrance surface/a light-exit surface of the wavelength converting unit can be designed to correspond to a light-guiding module, the optical coupling efficiency of the wavelength converting unit with respect to the light-guiding module can be improved.

An aspect of the present disclosure is to provide a wavelength converting module including a wavelength converting unit. The wavelength converting unit is at least made of a phosphor material. The wavelength converting unit is a solid rod-shaped structure, in which two opposite end surfaces of the rod-shaped wavelength converting unit are a light-entrance surface and a light-exit surface respectively.

In some embodiments, the wavelength converting unit is formed by sintering the phosphor material.

In some embodiments, the wavelength converting unit is a crystalline phosphor powder material. The crystalline phosphor powder material includes at least one of a single crystalline phosphor bulk material and a polycrystalline phosphor bulk material.

In some embodiments, the wavelength converting unit is a phosphor composite material. The phosphor composite material is formed by sintering the phosphor material with a ceramic material.

In some embodiments, the light-entrance surface and the light-exit surface have different areas.

In some embodiments, a cross-sectional area of the wavelength converting unit is increasing from one of the light-entrance surface and the light-exit surface with a smaller area to the another one of the light-entrance surface and the light-exit surface with a greater area.

In some embodiments, at least one of the light-entrance surface and the light-exit surface has at least one microscopic structure, and the microscopic structure is configured to reduce a reflectivity of a light beam incident thereon.

In some embodiments, the wavelength converting unit is excited by a first light beam with a first waveband to generate a second light beam with a second waveband. The wavelength converting module further includes a first optical unit disposed on the light-entrance surface. The first optical unit is one of an anti-reflection coating and a dichroic beam splitter, and the first optical unit is configured to allow the first light beam to pass therethrough and to reflect the second light beam.

In some embodiments, the wavelength converting unit is excited by a first light beam with a first waveband to generate a second light beam with a second waveband. The wavelength converting module further includes a second optical unit disposed on the light-exit surface. The second optical unit is one of an anti-reflection coating and a dichroic beam splitter, and the second optical unit is configured to reflect the first light beam and allow the second light beam to pass therethrough.

In some embodiments, the wavelength converting module further includes a reflective unit disposed on a surface of the wavelength converting unit between the light-entrance surface and the light-exit surface.

Another aspect of the present disclosure is to provide a light-source module including a wavelength converting module, an exciting light source, a light-guiding module, and a color wheel. The wavelength converting module includes a wavelength converting unit, in which the wavelength converting unit is at least made of a phosphor material. The wavelength converting unit is a solid rod-shaped structure, in which two opposite end surfaces of the rod-shaped wavelength converting unit are a light-entrance surface and a light-exit surface respectively. The exciting light source is configured to excite the wavelength converting unit. The light-guiding module is configured to receive and guide light beams provided by the wavelength converting unit and the exciting light source. The color wheel is configured to receive the light beams provided by the wavelength converting unit through the light-guiding module.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms.

According to the aforementioned problem that a solid-state light-emitting element employed in a light source module of an optical projector may have a poor heat dissipation efficiency and a poor optical coupling efficiency, an aspect of the present disclosure provides a wavelength converting module including a wavelength converting unit, in which the wavelength converting unit is made of a phosphor material and is a solid rod-shaped structure. With the rod-shaped solid structure of the wavelength converting unit, a heat dissipation efficiency and an optical coupling efficiency of the wavelength converting unit can be improved.

Figure 1A:
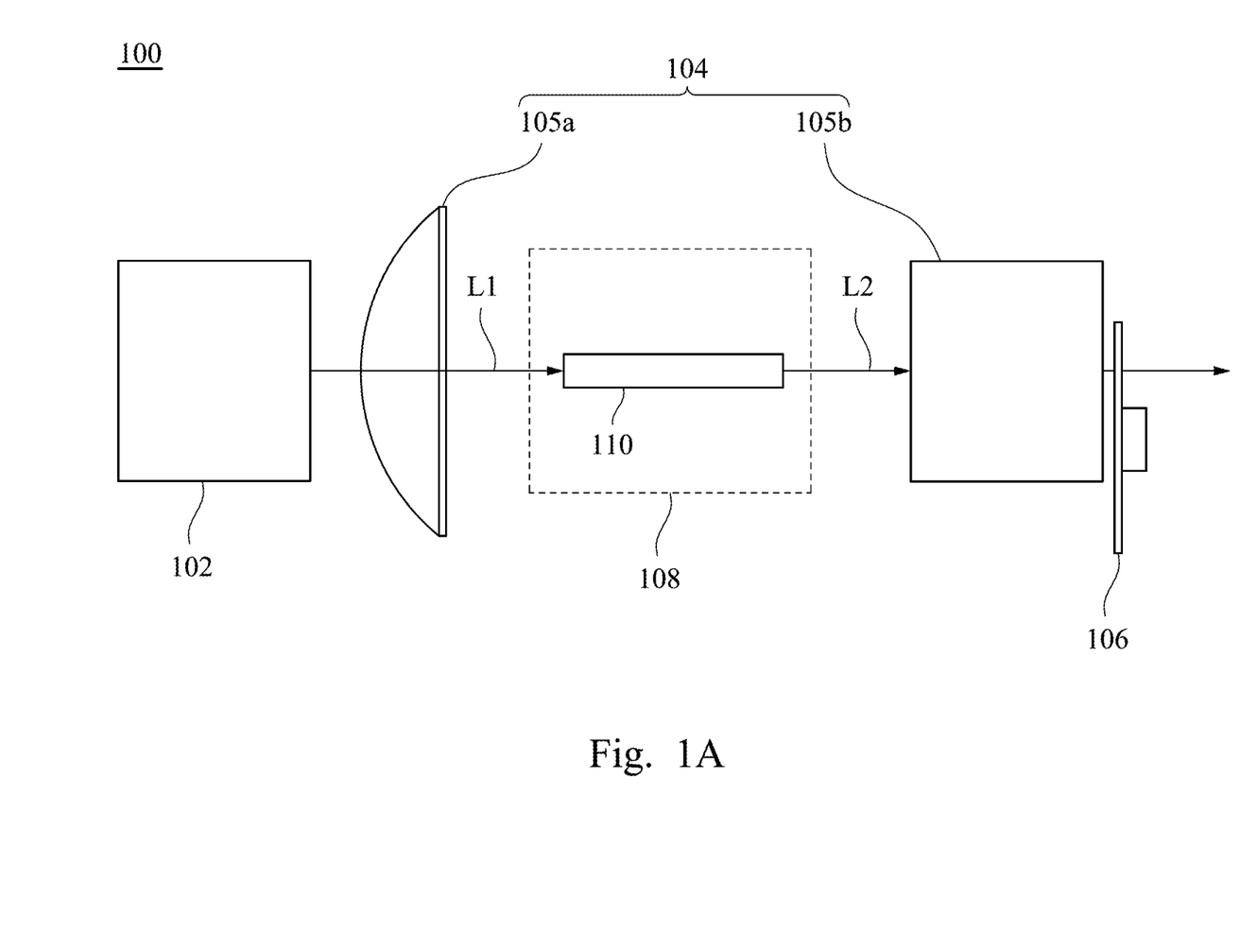
FIG. 1A is a schematic diagram showing a configuration of a light-source module according to a first embodiment of the present disclosure.
Figure 1B:
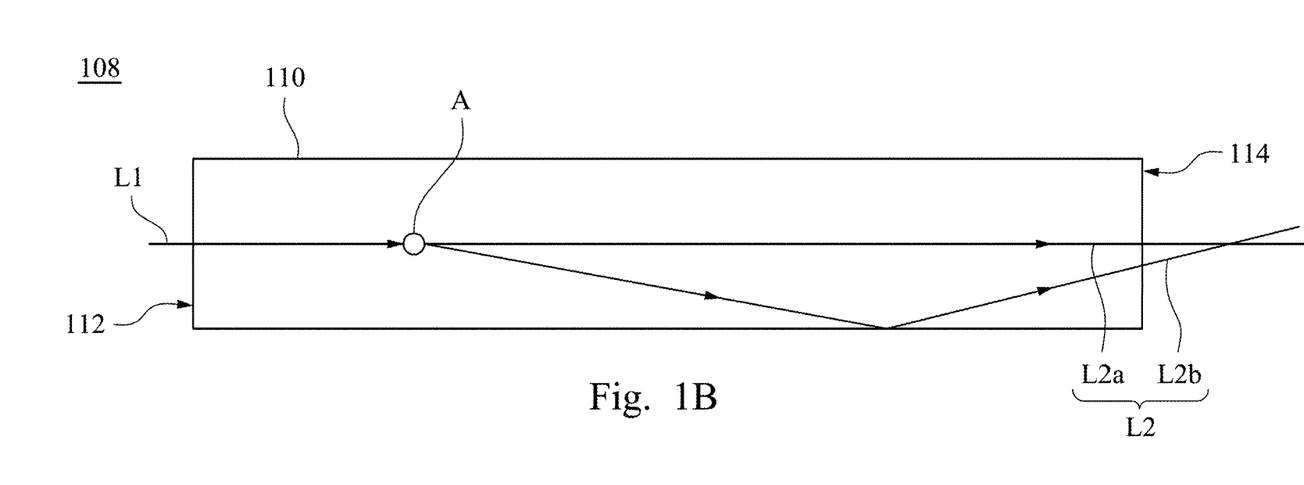
FIG. 1B is a schematic side view of a wavelength converting module of the light-source module illustrated in FIG. 1A.

FIG. 1A is a schematic diagram showing a configuration of a light-source module 100 according to a first embodiment of the present disclosure. FIG. 1B is a schematic side view of a wavelength converting module 108 of the light-source module 100 illustrated in FIG. 1A.

As shown in FIGS. 1A and 1B, a light-source module 100 includes a wavelength converting module 108, an exciting light source 102, a light-guiding module 104, and a color wheel 106. The wavelength converting module 108 includes a wavelength converting unit 110. The exciting light source 102 is configured to excite the wavelength converting unit 110, in which the exciting light source 102 can emit a first light beam L1 with a first waveband. The wavelength converting unit 110 can be excited by the first light beam L1 with the first waveband to generate a second light beam L2 with a second waveband. The light-guiding module 104 includes a first light-guiding element 105a and a second light-guiding element 105b. The first light-guiding element 105a is configured to receive the first light beam L1 provided by the exciting light source 102 and to guide the first light beam L1 to the wavelength converting unit 110. The second light-guiding element 105b is configured to receive the second light beam L2 provided by the wavelength converting unit 110 and to guide the second light beam L2 to the color wheel 106. The color wheel 106 is configured to receive and emit the light beam provided by the wavelength converting unit 110 through the light-guiding module 104.

The wavelength converting unit 110 is at least made of a phosphor material, and the wavelength converting unit 110 is a solid rod-shaped structure. Two opposite end surfaces of the rod-shaped wavelength converting unit 110 are a light-entrance surface 112 and a light-exit surface 114 respectively, in which a surface of the wavelength converting unit 110 between the light-entrance surface 112 and the light-exit surface 114 can be taken as a side surface thereof. With the rod-shaped wavelength converting unit 110, after the first light beam L1 provided by exciting light source 102 passes through the light-entrance surface 112 and enters the wavelength converting unit 110, the wavelength converting unit 110 can be excited by the first light beam L1 to emit the second light beam L2.

Under this configuration, the excitation of the wavelength converting unit 110 is achieved by guiding the first light beam L1 into the wavelength converting unit 110. Therefore, the first light beam L1 may not need to be focused as a light spot or a light point, such that the first light beam L1 can have a lower energy density and the heat brought into the wavelength converting unit 110 by the first light beam L1 will not be accumulated in some parts of the wavelength converting unit 110. Accordingly, since the heat is not be accumulated in the some parts of the wavelength converting unit 110, reduction of a light emission efficiency of the phosphor material of the wavelength converting unit 110 caused by the accumulation of the heat may not occur.

The wavelength converting unit 110 can be formed by sintering the phosphor material. The phosphor material includes a garnet structure crystal, such as YAG, TAG or LuAG. Alternatively, The phosphor material includes phosphor powder, such as silicate or nitride. Moreover, since the wavelength converting unit 110 is formed by sintering the phosphor material, the wavelength converting unit 110 can have a higher thermal conductivity coefficient. In other words, during an operation of the wavelength converting unit 110, the heat in the wavelength converting unit 110 can be conducted to the side surface of the wavelength converting unit 110, so as to be dissipated away from the wavelength converting unit 110.

In some embodiments, the wavelength converting unit 110 may be a crystalline phosphor powder material, in which the crystalline phosphor powder material includes at least one of a single crystalline phosphor bulk material and a polycrystalline phosphor bulk material. Thus, the wavelength converting unit 110 can be formed by one single phosphor material. Furthermore, in other embodiments, the wavelength converting unit 110 may be a phosphor composite material, in which the phosphor composite material is formed by sintering the phosphor material with a ceramic material.

In the present embodiment, the second light beam L2 can be guided by a refractive index of the wavelength converting unit 110. In FIG. 1B, after the wavelength converting unit 110 is excited by the first light beam L1, the second light beam L2 is generated. For example, when a point A of the wavelength converting unit 110 is excited by the first light beam L1, the second light beams L2a and L2b are generated. The second light beam L2a can be propagated to leave the wavelength converting unit 110 through the light-exit surface 114, and then the second light beam L2a is received by the second light-guiding element 105b. The second light beam L2b may be propagated to the side surface of the wavelength converting unit 110, in which the side surface can be taken as an interface between the wavelength converting unit 110 and the external dielectric (for example, the external dielectric may be air of which a refractive index is 1). As described previously, since the wavelength converting unit 110 is made of the phosphor material, the wavelength converting unit 110 may have refractive index in a range from about 1.5 to about 2.0. When the second light beam L2b travels to the side surface which is taken as the interface, the second light beam L2b can be reflected from the side surface due to total internal reflection (TIR), and then the second light beam L2b travels toward the light-exit surface 114.

In other words, with the refractive index of the wavelength converting unit 110, as the second light beam L2b travels to the side surface with the condition of satisfying TIR (i.e., satisfying the condition in which an incident angle of the second light beam L2b with respect to the side surface is greater than a critical TIR angle), the second light beam L2b can be reflected from the side surface to travel toward the light-exit surface 114. Under this configuration, in the wavelength converting unit 110, most of the second light beam L2 can be propagated to leave the rod-shaped wavelength converting unit 110 and travel toward the second light-guiding element 105b through the light-exit surface 114. Since the second light beam L2 can be propagated to leave the rod-shaped wavelength converting unit 110 through the light-exit surface 114, with the light shape of the second light beam L2 under this condition, an optical coupling efficiency of the wavelength converting unit 110 with respect to the second light-guiding element 105b is improved.

Figure 1C:
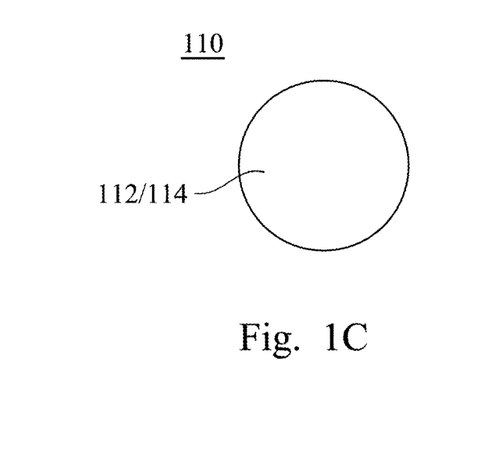
FIGS. 1C-1E are schematic diagrams of light-entrance surfaces/light-exit surfaces according to various embodiments.
Figure 1D:
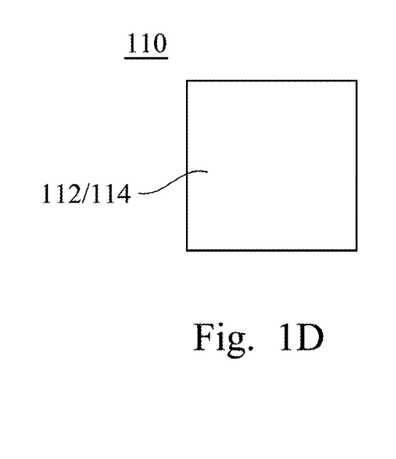
Figure 1E:
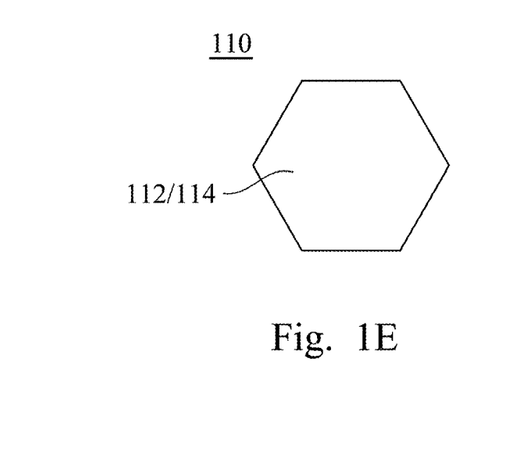

In addition, a design of the light-entrance surface 112/light-exit surface 114 of the wavelength converting unit 110 can be varied according to the light-guiding module 104. In other words, shapes or sizes of the light-entrance surface 112/light-exit surface 114 of the wavelength converting unit 110 can be designed to correspond to the first light-guiding element 105a/second light-guiding element 105b, such that the loss of the light beam traveling therebetween is reduced, thereby improving an optical coupling efficiency of the light-source module. For example, as shown in FIGS. 1C-1E, FIGS. 1C-1E are schematic diagrams of light-entrance surfaces 112/light-exit surfaces 114 according to various embodiments. The shape of the light-entrance surface 112/light-exit surface 114 can be circular (as shown in FIG. 1C), rectangular (as shown in FIG. 1D) or polygonal (as shown in FIG. 1E).

As described above, the wavelength converting unit of the wavelength converting module of the present disclosure is made of the phosphor material, and is the solid rod-shaped structure. For the first light beam which is configured to excite the wavelength converting unit, the first light beam may not need to be focused as a light spot or a light point, such that the first light beam can have a lower energy density. Therefore, since the heat brought into the wavelength converting unit by the first light beam will not be accumulated in some parts of the wavelength converting unit, the light emission efficiency of the wavelength converting unit can be improved. Moreover, since the shapes or the sizes of the light-entrance surface/the light-exit surface can be designed to correspond to the light-guiding module, the optical coupling efficiency of the light-source module of the light-source module is improved.

Figure 2:
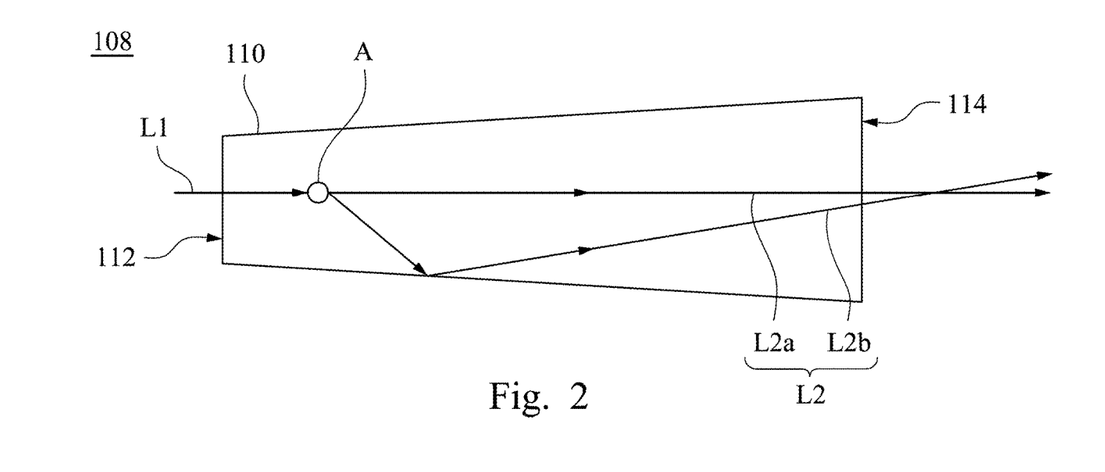
FIG. 2 is a schematic side view of a wavelength converting module of a light-source module according to a second embodiment of the present disclosure.

FIG. 2 is a schematic side view of a wavelength converting module 108 of a light-source module according to a second embodiment of the present disclosure. The difference between the present embodiment and the first embodiment is that the light-entrance surface 112 and the light-exit surface 114 of the wavelength converting unit 110 of the present embodiment have different areas. Furthermore, a cross-sectional area of the wavelength converting unit 110 is increasing from one of the light-entrance surface 112 and the light-exit surface 114 with a smaller area to another one of the light-entrance surface 112 and the light-exit surface 114 with a greater area. Thus, the cross-sectional area of the wavelength converting unit 110 is increased from the light-entrance surface 112 to the light-exit surface 114.

In the present embodiment, since the cross-sectional area of the wavelength converting unit 110 is increasing from the light-entrance surface 112 to the light-exit surface 114, the side surface of the wavelength converting unit 110 may slant to a symmetry axis of the wavelength converting unit 110. Under this configuration, since the incident angle of the second light beam L2 with respect to the side surface is increased, the amount of the second light beam L2 which can be reflected from the side surface by TIR is increased as well. Accordingly, the amount of the second light beam L2 which can be emitted from the light-exit surface 114 by the wavelength converting unit 110 is increased, thereby improving the light emission efficiency and the light emission amount of the wavelength converting unit 110.

Figure 3:
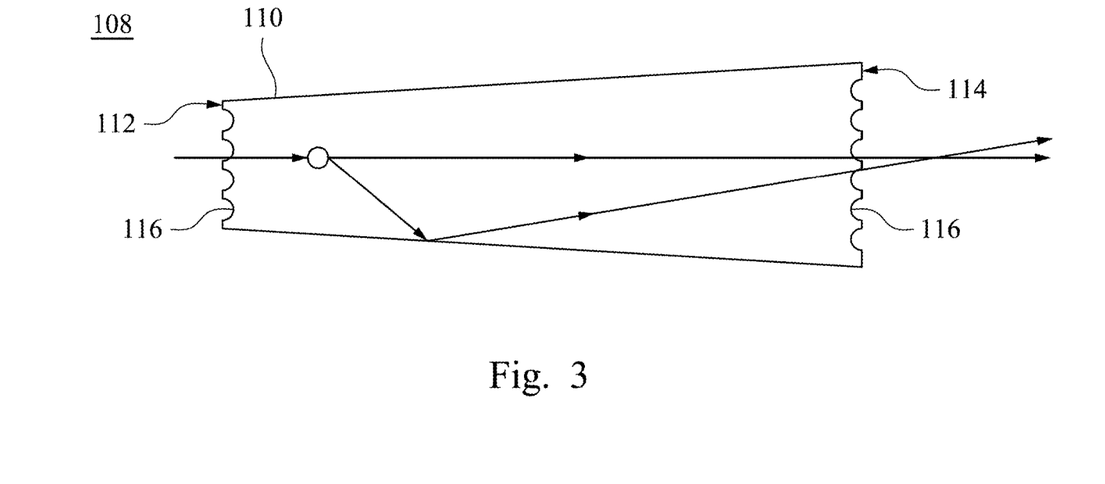
FIG. 3 is a schematic side view of a wavelength converting module of a light-source module according to a third embodiment of the present disclosure.

FIG. 3 is a schematic side view of a wavelength converting module 108 of a light-source module according to a third embodiment of the present disclosure. The difference between the present embodiment and the second embodiment is that at least one of the light-entrance surface 112 and the light-exit surface 114 of the wavelength converting unit 110 has at least one microscopic structure 116. The microscopic structure 116 is configured to reduce a reflectivity of a light beam incident thereon. For example, the microscopic structure 116 can be a microstructure or a nanostructure. The microstructure can affect the TIR occurring thereon so as to reduce the reflection thereof, thereby increasing the amount of the light entering therein or exiting therefrom. The nanostructure can be designed to correspond to the main and minor waveband according to the setting of the waveband of the light beam passing therethrough, so as to reduce the reflectivity thereof. In a configuration, the nanostructure can be taken as a moth-eye structure. Furthermore, the microscopic structure 116 disposed on the light-entrance surface 112 can increase the amount of the light beam entering the wavelength converting unit 110. The microscopic structure 116 disposed on the light-exit surface 114 can increase the amount of the light beam exiting the wavelength converting unit 110 through the light-exit surface 114. Therefore, with the disposition of the microscopic structure 116, the light emission efficiency of the wavelength converting unit 110 is improved.

Figure 4:
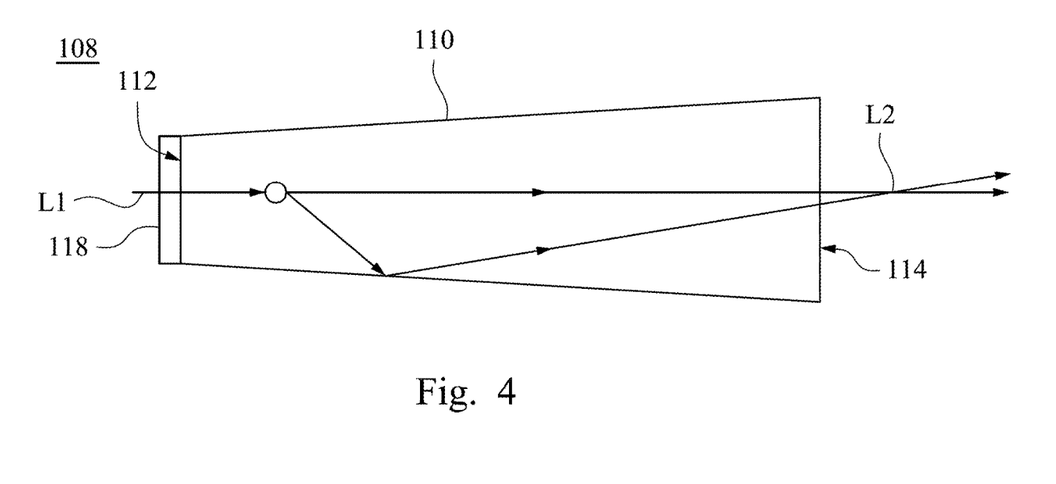
FIG. 4 is a schematic side view of a wavelength converting module of a light-source module according to a fourth embodiment of the present disclosure.

FIG. 4 is a schematic side view of a wavelength converting module 108 of a light-source module according to a fourth embodiment of the present disclosure. The difference between the preset embodiment and the second embodiment is that the wavelength converting module 108 of the present embodiment further includes a first optical unit 118 disposed on the light-entrance surface 112, in which the first optical unit 118 is configured to allow the first light beam L1 to pass therethrough and to reflect the second light beam L2. For example, the first optical unit 118 can be one of an anti-reflection coating and a dichroic beam splitter, in which the dichroic beam splitter can allow the first light beam L1 with the first waveband to pass therethrough.

With the first optical unit 118, the loss of the first light beam L1 is reduced when the first light beam L1 enters the wavelength converting unit 110. Furthermore, when the second light beam L2 is generated, the second light beam L2 traveling to the light-entrance surface 112 can be reflected by the first optical unit 118, such the light leakage of the second light beam L2 from the wavelength converting unit 110 through the light-entrance surface 112 is reduced. Therefore, with the disposition of the first optical unit 118, the light emission efficiency of the wavelength converting unit 110 is improved.

Figure 5:
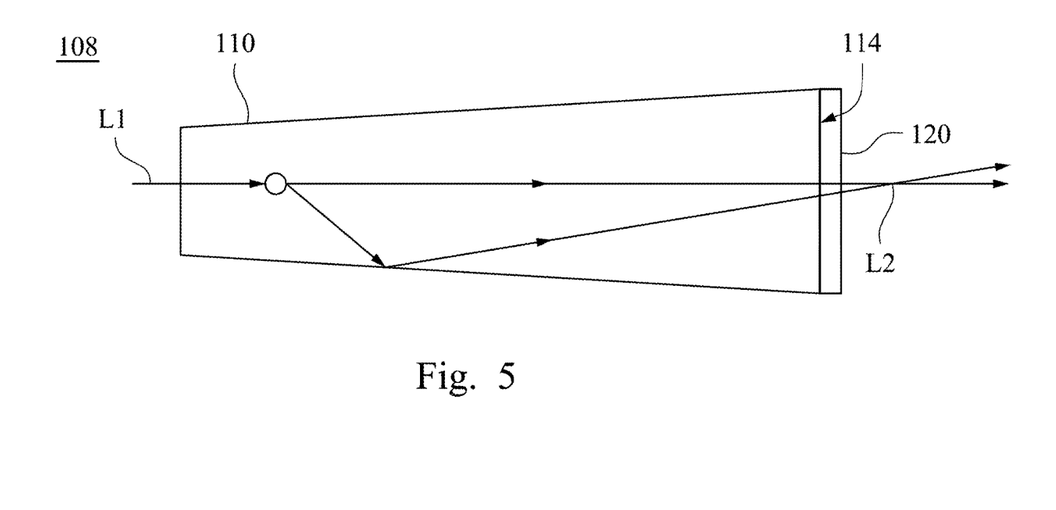
FIG. 5 is a schematic side view of a wavelength converting module of a light-source module according to a fifth embodiment of the present disclosure.

FIG. 5 is a schematic side view of a wavelength converting module 108 of a light-source module according to a fifth embodiment of the present disclosure. The difference between the preset embodiment and the second embodiment is that the wavelength converting module 108 of the present embodiment further includes a second optical unit 120 disposed on the light-exit surface 114, in which the second optical unit 120 is configured to reflect the first light beam L1 and allow the second light beam L2 to pass therethrough. Similarly, the second optical unit 120 can be one of an anti-reflection coating and a dichroic beam splitter, in which the dichroic beam splitter can reflect the first light beam L1 with the first waveband.

With the second optical unit 120, the first light beam L1 traveling to the light-exit surface 114 can be reflected by the second optical unit 120, such that the light leakage of the first light beam L1 from the wavelength converting unit 110 through the light-exit surface 114 is reduced. Furthermore, the loss of the second light beam L2 emitted from the wavelength converting unit 110 through light-exit surface 114 can be reduced. Therefore, with the disposition of the second optical unit 120, the light emission efficiency of the wavelength converting unit 110 is improved.

Figure 6:
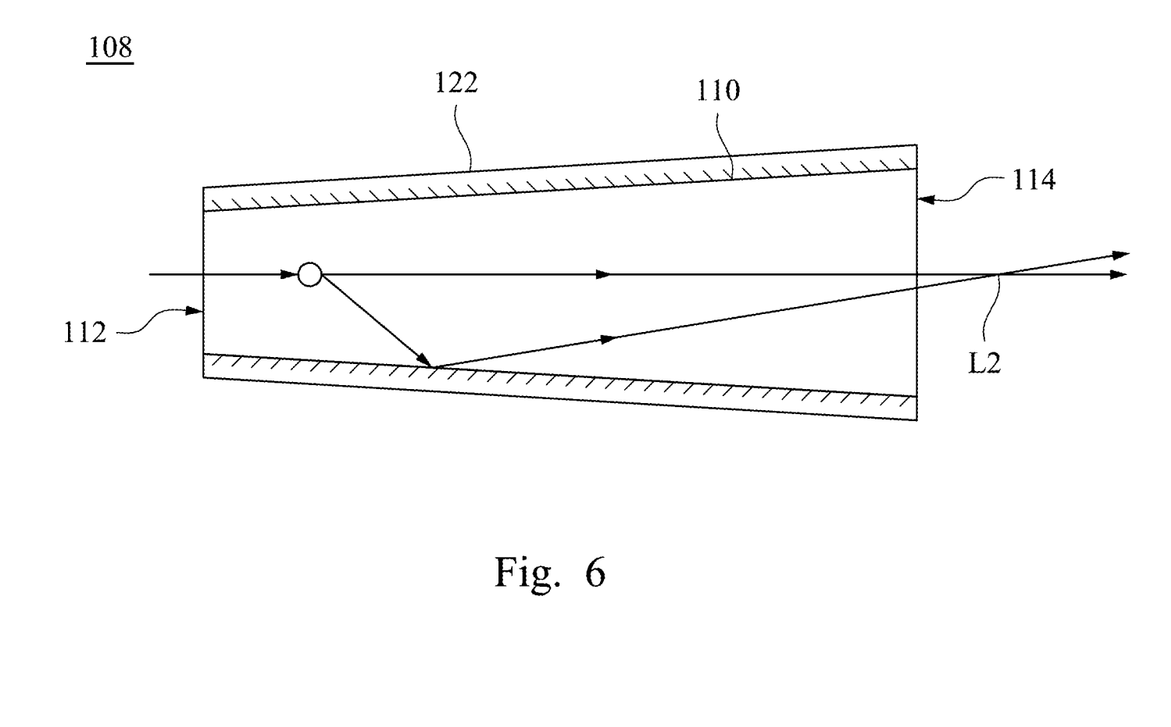
FIG. 6 is a schematic side view of a wavelength converting module of a light-source module according to a sixth embodiment of the present disclosure.

FIG. 6 is a schematic side view of a wavelength converting module 108 of a light-source module according to a sixth embodiment of the present disclosure. The difference between the present embodiment and the second embodiment is that the wavelength converting module 108 of the present embodiment further includes a reflective unit 122 disposed on the surface of the wavelength converting unit 110 between the light-entrance surface 112 and the light-exit surface 114. In other words, the reflective unit 122 is disposed on the side surface of the wavelength converting unit 110. In the present embodiment, according to the setting of the light beam provided by the wavelength converting module 108, the reflective unit 122 can be a dichroic mirror or a mirror coating. When the wavelength converting module 108 is designed to provide a light beam with a predetermined waveband, the reflective unit 122 can be the dichroic mirror, such that the light beam with the predetermined waveband can be reflected by the reflective unit 122. When the wavelength converting module 108 is designed to provide a light beam of a full waveband (for example, a visible waveband), the reflective unit 122 can be a mirror coating coated on the side surface of the wavelength converting unit 110, such that the light beam of the full waveband can be reflected by the reflective unit 122.

With the disposition of the reflective unit 122, the second light beam L2 leakage from the wavelength converting unit 110 through the side surface of the wavelength converting unit 110 is prevented, such that the second light beam L2 can be guided to the light-exit surface 114 more effectively, thereby improving the light emission efficiency of the wavelength converting unit 110.

Figure 7A:
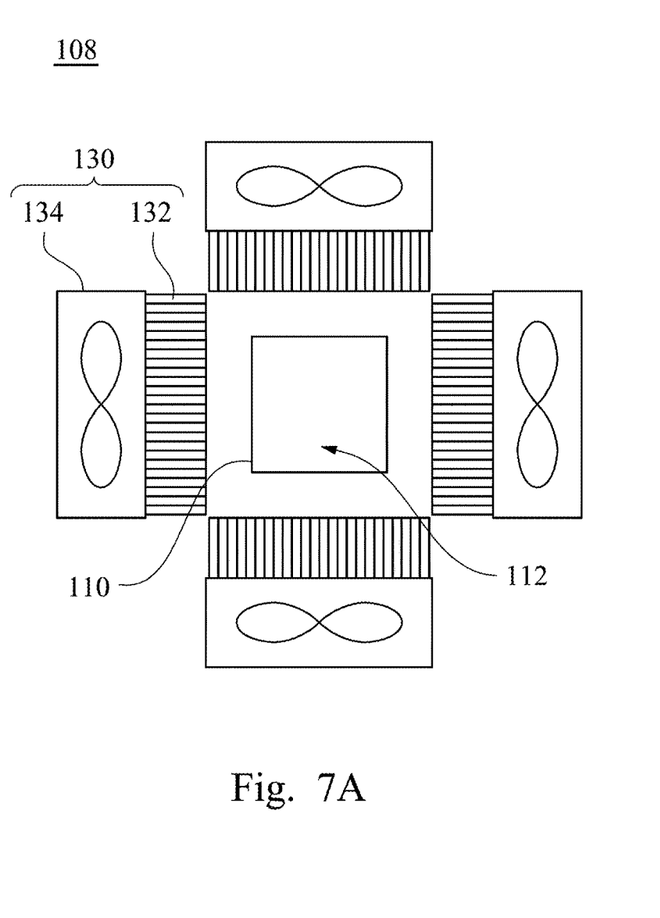
FIGS. 7A and 7B are schematic diagrams of wavelength converting modules of light-source modules according to a seventh embodiment of the present disclosure.
Figure 7B:
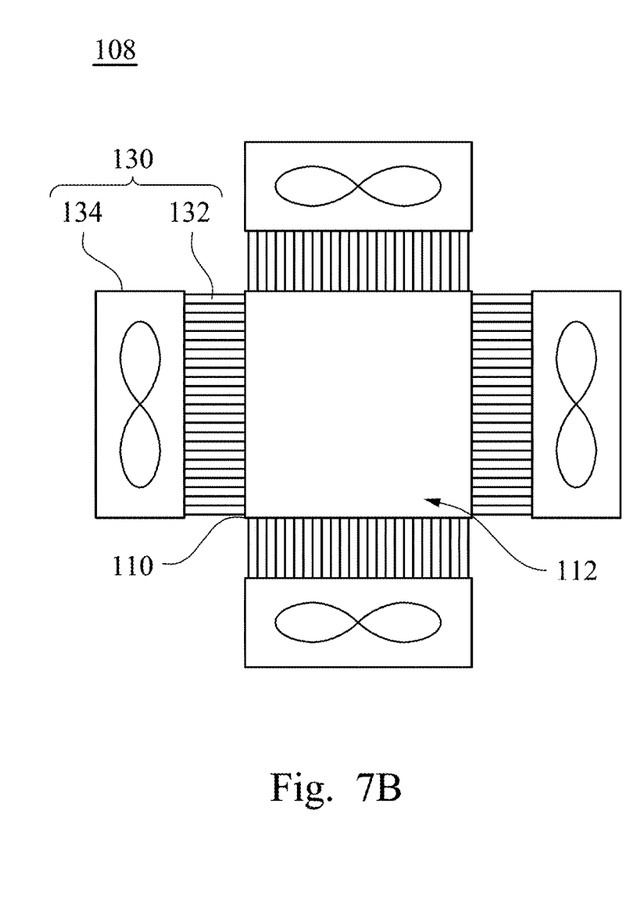

FIGS. 7A and 7B are schematic diagrams of wavelength converting modules 108 of light-source modules according to a seventh embodiment of the present disclosure. Each of the wavelength converting modules 108 illustrated in FIGS. 7A and 7B is viewed along a direction normal to the light-entrance surface 112 of the wavelength converting unit 110. The difference between the present embodiment and the first embodiment is that the wavelength converting modules 108 further includes heat dissipation units 130 disposed around the wavelength converting unit 110. Each of the heat dissipation units 130 includes a heat dissipation plate 132 and a fan 134, in which the heat dissipation plate 132 can be connected to the wavelength converting unit 110 and the fan 134 can be connected to the heat dissipation plate 132.

In the configurations of the wavelength converting modules 108, the wavelength converting unit 110 can be operated without an actuator (such as a motor). Therefore, during the operation of the wavelength converting unit 110, at least one metal or material with a high thermal conductivity can be disposed around the wavelength converting unit 110 so as to expel out the heat in the wavelength converting unit 110. Accordingly, by improving the heat dissipation efficiency of the wavelength converting unit 110, the light emission efficiency of the wavelength converting unit 110 can be improved.

In FIG. 7A, the heat dissipation plates 132 and the fans 134 are disposed around the wavelength converting unit 110. The heat dissipation plates 132 are configured to receive the heat in the wavelength converting unit 110 by heat exchange. The fans 134 are configured to expel out the heat in the heat dissipation plates 132.

In FIG. 7B, the heat dissipation plates 132 and the fans 134 are disposed around the wavelength converting unit 110. During the operation of the wavelength converting unit 110, since the wavelength converting unit 110 stands still relatively in the wavelength converting module 108, the heat dissipation plates 132 can be disposed contacting the wavelength converting unit 110. With the heat dissipation plate 132 contacting the wavelength converting unit 110, the heat in the wavelength converting unit 110 can be transferred to the heat dissipation plates 132 through heat conduction, thereby improving the heat dissipation efficiency of each of the heat dissipation units 130 with respect to the wavelength converting unit 110. Accordingly, with the disposition of the heat dissipation units 130, the heat dissipation efficiency and the light emission efficiency of the wavelength converting unit 110 can be correspondingly improved.

Furthermore, in the above embodiments, although the components in the different embodiments are independently described, some of the components can be arranged together. For example, in the same wavelength converting unit, the first optical unit and the second optical unit can be respectively disposed on the light-entrance surface and the light-exit surface.

As described above, the wavelength converting unit of the wavelength converting module of the present disclosure is made of the phosphor material and is a solid rod-shaped solid structure. With the solid rod-shaped structure, the optical coupling efficiency and the heat dissipation efficiency of the wavelength converting unit can be improved. Moreover, since the shapes or the sizes of the light-entrance surface/light-exit surface can be designed to correspond to the light-guiding module, the optical coupling efficiency of the wavelength converting unit with respect to the light-guiding module can be improved. In addition, with the dispositions of the microscopic structure, the first optical unit, the second optical unit, the reflective unit, and the heat dissipation units, the light emission efficiency and the heat dissipation efficiency of the wavelength converting unit can be further improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. A light-source module, comprising:
   a wavelength converting module comprising a wavelength converting unit, wherein the wavelength converting unit is a solid rod-shaped structure made of a crystalline phosphor bulk, the crystalline phosphor bulk comprises a single crystalline phosphor material or a polycrystalline phosphor material, and two opposite end surfaces of the wavelength converting unit are respectively a light-entrance surface and a light-exit surface, wherein the wavelength converting unit tapers from the light-exit surface to the light-entrance surface;
   an exciting light source configured to excite the wavelength converting unit and aim at the light-entrance surface;
   a light-guiding module configured to receive and guide light beams provided by the wavelength converting unit and the exciting light source; and
   a color wheel configured to receive the light beams provided by the wavelength converting unit through the light-guiding module.

2. The light-source module of claim 1, wherein the wavelength converting unit is formed by sintering the phosphor material.

3. The light-source module of claim 1, wherein a cross-sectional area of the wavelength converting unit increases from one of the end surfaces to another one of the end surfaces.

4. The light-source module of claim 1, wherein each of the light-entrance surface and the light-exit surface has at least one microscopic structure which is configured to reduce a reflectivity of a light beam incident thereon.

5. The light-source module of claim 1, wherein the wavelength converting unit is excited by a first light beam with a first waveband to generate a second light beam with a second waveband, and the wavelength converting module further comprises a first optical unit disposed on the light-entrance surface, wherein the first optical unit is one of an anti-reflection coating and a dichroic beam splitter, and the first optical unit is configured to allow the first light beam to pass therethrough and to reflect the second light beam.

6. The light-source module of claim 1, wherein the wavelength converting unit is excited by a first light beam with a first waveband to generate a second light beam with a second waveband, and the wavelength converting module further comprises a second optical unit disposed on the light-exit surface, wherein the second optical unit is one of an anti-reflection coating and a dichroic beam splitter, and the second optical unit is configured to reflect the first light beam and allow the second light beam to pass therethrough.

7. The light-source module of claim 1, wherein the wavelength converting module further comprises a reflective unit disposed on a surface of the wavelength converting unit between the light-entrance surface and the light-exit surface.

* * * * *